(12) United States Patent
Takemasa et al.

(10) Patent No.: US 10,760,692 B2
(45) Date of Patent: Sep. 1, 2020

(54) MIXTURE PREVENTING VALVE

(71) Applicant: SUNTORY HOLDINGS LIMITED, Osaka (JP)

(72) Inventors: Ryo Takemasa, Kyoto (JP); Tokio Takahashi, Kyoto (JP); Junichi Sawazaki, Gunma (JP); Masayuki Ozawa, Gunma (JP); Daisuke Takahashi, Gunma (JP); Hideo Tanaka, Tokyo (JP); Christopher Psutka, Tokyo (JP); Hideo Tsukazaki, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 15/846,380

(22) Filed: Dec. 19, 2017

(65) Prior Publication Data

US 2018/0172164 A1 Jun. 21, 2018

(30) Foreign Application Priority Data

Dec. 20, 2016 (JP) .................................. 2016-246412

(51) Int. Cl.
*F16K 1/44* (2006.01)
*B67D 1/12* (2006.01)
(Continued)

(52) U.S. Cl.
CPC ............ *F16K 1/446* (2013.01); *B67D 1/1284* (2013.01); *F16K 1/12* (2013.01); *F16K 49/005* (2013.01)

(58) Field of Classification Search
CPC . F16K 1/44; F16K 1/443; F16K 1/446; Y10T 137/8803; Y10T 137/88038; Y10T 137/88046; Y10T 137/4259
(Continued)

(56) References Cited

U.S. PATENT DOCUMENTS 4,360,039 A 11/1982 Jeppsson
6,230,736 B1 5/2001 Scheible et al.
(Continued)

FOREIGN PATENT DOCUMENTS

DE 202011004300 U1 * 10/2011 ............. F16K 1/446
EP 0545846 6/1993
(Continued)

OTHER PUBLICATIONS

Machine Translation of GB202011004300 (Year: 2006).*
(Continued)

*Primary Examiner* — Michael R Reid
(74) *Attorney, Agent, or Firm* — Greenblum & Bernstein, P.L.C.

(57) ABSTRACT

Mixture preventing valve includes first flow passage allowing a first fluid to flow; second flow passage allowing a second fluid to flow; communication passage allowing first flow passage and second flow passage to communicate with each other; valve body that opens/closes communication passage; and valve seat provided on an inner wall surface of the communication passage that contacts valve body. Valve body includes first valve body piece and second valve body piece arranged side by side in a state of being separated from each other in a movement direction of valve body. Valve seat contacts respective outer peripheral surfaces of first valve body piece and second valve body piece. In the inner wall surface, a portion where valve seat contacts outer peripheral surface of first valve body piece, and a portion where valve seat contacts outer peripheral surface of the second valve body piece exist on a same plane.

6 Claims, 5 Drawing Sheets

(51) Int. Cl.
 *F16K 1/12* (2006.01)
 *F16K 49/00* (2006.01)
(58) Field of Classification Search
 USPC .................. 137/240, 614.17, 614.18, 614.19
 See application file for complete search history.

(56) References Cited

U.S. PATENT DOCUMENTS

2002/0185626 A1  12/2002  Newberg
2015/0060716 A1   3/2015  Picot et al.
2018/0216486 A1   8/2018  Futahashi et al.

FOREIGN PATENT DOCUMENTS

| JP | 7-63272 A    | 3/1995 |
| JP | 2000-240819  | 9/2000 |
| JP | 2009-052712  | 3/2009 |
| JP | 2016-98969 A | 5/2016 |

OTHER PUBLICATIONS

Office Action issued in European Patent Office (EPO) Counterpart Patent Appl. No. 17207979.0, dated May 17, 2019.
Official Communication issued in European Patent Office (EPO) Patent Application No. 17207979.0, dated Apr. 20, 2018.
Notice of Reasons for Refusal received in Japanese Patent Application No. 2016-246412, dated Jan. 21, 2020 and English translation thereof.

\* cited by examiner

MIXTURE PREVENTING VALVE

BACKGROUND OF THE INVENTION

Field of the Invention

The present invention relates to a mixture preventing valve, and more particularly to a mixture preventing valve having a configuration in which a communication passage enabling two flow passages to partially communicate with each other is opened and closed by a plurality of valve bodies.

Description of the Related Art

Interposing a communication passage between respective one parts of flow passages of different kind of fluids such as beverages such as a refreshing beverage and an alcoholic beverage, and washing water, and enabling the flow passages to communicate with each other is already known in a field of fluid transport. Additionally, a mixture preventing valve is known as a device for switching opening and closing for the above communication passage. This mixture preventing valve has a valve body capable of moving inside the communication passage, and switches opening and closing of the communication passage through moving operation (specifically, contact with and separation from valve seat) of the valve body.

Some mixture preventing valves that have a plurality of valve bodies exist (refer to Japanese Patent Laid-Open No. 2000-240819, for example). A configuration of the mixture preventing valve having a plurality of valve bodies will be described with reference to FIGS. 5a and 5b. These figures illustrate an example in which a mixture preventing valve 100 is disposed at an intersection portion of an upper pipe part 110 for allowing washing water such as washing chemicals and hot water to flow, and a lower pipe part 120 for allowing beer, a refreshing beverage, or the like to flow, a plurality of which are disposed in the same plane, for example. The mixture preventing valve 100 includes a first valve body 101 and a second valve body 102 that enable the upper and lower pipe parts 110, 120 to communicate with each other, and in FIGS. 5a and 5b, both the valve bodies 101, 102 are located in a communication passage 103 that allows inner spaces of the upper and lower pipe parts 110, 120 to communicate with each other. The mixture preventing valve 100 includes a valve rod 105 and a drain pipe 106 that penetrate the upper and lower pipe parts 110, 120, respectively, the first valve body 101 is formed in a lower part of the outer housing 105A of the valve rod 105, and the second valve body 102 is formed in an upper part of the drain pipe 106. The valve body 105 (outer housing 105A) and the drain pipe 106 vertically drive, so that the first and second valve bodies 101, 102 move between a position where both valve bodies come into contact with the valve seat 104 (first valve seat 104a, second valve seat 104b) formed on an inner wall surface of the communication passage 103 (state of FIGS. 5a and 5b), and a position where both valve bodies separated from the valve seat.

In the mixture preventing valve 100, in the state of FIGS. 5a and 5b, both the first valve body 101 and the second valve body 102 lower to come into contact with the valve seat 104, so that the communication passage 103 is blocked, washing water and a product independently flow through the upper pipe part and the lower pipe part, respectively. On the other hand, both the valve bodies 101, 102 are raised, so that the communication passage 103 is opened, and the upper and lower pipe parts can be communicated with each other. Consequently, for example, the washing water flowing through the upper pipe part 110 flows in the lower pipe part 120 through the communication passage 103, so that the lower pipe part 120 can be washed. The mixture preventing valve 100 of FIGS. 5a and 5b includes a mix proof function. In this figure, when water hammering is generated in the lower pipe part 120 to raise the pressure, and this pressure becomes larger than urging force of a spring 107, the drain pipe 106 rises by an amount of pressure increased against the urging force of the spring. At this time, the first valve body 101 keeps the state in which the communication passage 103 is blocked. However, the second valve body 102 and the valve seat 104b are separated, and therefore a part of the product in the lower pipe part 120 passes through a clearance between the second valve body and the valve seat to flow downward through the inside of the drain pipe 106.

In such a conventional mixture preventing valve 100, the inner wall surface of the communication passage 103 formed with the valve seat 104 has a complicated shape. More specifically, as illustrated in FIGS. 5a and 5b, in the inner wall surface forming the communication passage 103, the first valve seat 104a with which the first valve body 101 comes into contact, and the second valve seat 104b with which the second valve body 102 comes into contact are not in the same plane, and a step in the vertical direction is formed between both valve seats.

As described above, in a case where the communication passage 103 has the complicated shape, when the mixture preventing valve 100 is opened, the upper and lower pipe parts 110, 120 are communicated with each other, and fluid flows through the communication passage 103, a vortex is generated in a flow of the fluid in a periphery of the valve seat 104, and flow velocity lowers. Particularly, in case where the fluid is fluid for washing (for example, washing liquid), the fluid lowers the flow velocity in a periphery of the communication passage 103, so that there is a problem that a long time is required in order to suitably perform washing of the periphery of the communication passage.

The present invention has been made in view of the above problem, and an object of the invention is to provide a mixture preventing valve having a configuration in which a valve body comes into contact with a valve seat at a plurality of portions, and enables fluid to smoothly flow in the periphery of the valve seat.

SUMMARY OF THE INVENTION

The problem is solved by a mixture preventing valve of the present invention, the mixture preventing valve having: a first flow passage for allowing a first fluid to flow; a second flow passage for allowing a second fluid to flow; a communication passage for allowing the first flow passage and the second flow passage to communicate with each other; a valve body that moves to open and close the communication passage; and a valve seat that is provided on an inner wall surface of the communication passage, and comes into contact with the valve body; wherein the valve body includes a first valve body piece and a second valve body piece that are arranged side by side in a state of being separated from each other in a movement direction of the valve body, wherein the valve seat comes into contact with respective outer peripheral surfaces of the first valve body piece and the second valve body piece, and in the inner wall surface, a portion where the valve seat comes into contact with the outer peripheral surface of first valve body piece, and a portion where the valve seat comes into contact with the outer peripheral surface of the second valve body piece exist on the same plane.

In the mixture preventing valve of the present invention, which is configured as described above, in the inner wall surface of the communication passage constituting the valve seat, the portion that comes into contact with the outer peripheral surface of first valve body piece, and the portion that comes into contact with the outer peripheral surface of the second valve body piece exist on the same plane. With such a configuration, the shape of the formation surface of the valve seat is simplified, and therefore when fluid flows into the communication passage, and the fluid is unlikely to stagnate in the periphery of the valve seat. That is, the fluid smoothly flows in the periphery of the valve seat.

In the above configuration, it is preferable that a tapered surface having a diameter which reduces from one end side to the other end side in the movement direction is formed in the inner wall surface, the respective outer peripheral surfaces of the first valve body piece and the second valve body piece each have a diameter which reduces from one end side to the other end side in the movement direction, and the portion where the valve seat comes into contact with the outer peripheral surface of the first valve body piece, and the portion where the valve seat comes into contact with the outer peripheral surface of the second valve body piece exist on the tapered surface.

In the above configuration, the first valve body piece comes into contact with the valve seat on the one end side of the tapered surface in the movement direction of the valve body, and the second valve body piece comes into contact with the valve seat on the other end side. Thus, the tapered surface is formed in the inner wall surface of the communication passage, and the tapered surface constitutes the valve seat, so that with more simplified configuration, it is possible to implement effects, for example, the shape of the formation surface of the valve seat is simplified, and fluid smoothly flows in the periphery of the valve seat.

In the above configuration, it is more preferable that the mixture preventing valve has a valve rod that supports the valve body and moves integrally with the valve body in the movement direction, wherein the valve rod extends in the movement direction, and protrudes outside the first flow passage across only the first flow passage among the first flow passage and the second flow passage.

In the above configuration, the valve rod supporting the valve body protrudes outside the first flow passage across only the first flow passage among the first flow passage and the second flow passage. On the other hand, as illustrated in FIGS. 5a and 5b, a drain pipe that penetrates the second flow passage is provided, for example, in a case where hot water flows through the first flow passage, and a product such as beer and a refreshing beverage flows through the second flow passage, when hot water in the first flow passage flows through the drain pipe, beer or the like in the second flow passage is heated, and the quality of the beer or the like may be changed, and a burn may be generated on an outer wall part of the drain pipe. Such a drain pipe is not provided, and therefore the quality of the product such as beer can be stabilized.

In the above configuration, it is more preferable that the first valve body piece is disposed at a position closer to the second flow passage than the second valve body piece in the movement direction, and is movable relatively to the second valve body piece in the movement direction, and it is more preferable that a space adjacent to the communication passage in a direction intersecting with the movement direction is provided, the space is opened to atmosphere, and when the first valve body piece relatively moves in such a direction as to approach the second valve body piece in the movement direction, the space communicates with the communication passage and the second flow passage communicate.

In the above configuration, the space opened to the atmosphere is provided at a position adjacent to the communication passage, and when the first valve body piece moves in such a direction as to approach the second valve body piece, the above space communicates with the communication passage and the second flow passage. Consequently, in a case where the first valve body piece is pressed in such a direction as to approach the second valve body piece due to pressure change inside the second flow passage or occurrence of the water hammering phenomenon, fluid (second fluid) flowing in the second flow passage can be released to the atmosphere through the above space at this point.

According to the mixture preventing valve of the present invention, in a configuration in which both the first valve body piece and the second valve body piece constituting the valve body come into contact with the valve seat, fluid smoothly flows the periphery of the valve seat that comes into contact with the respective outer surfaces of the valve body pieces.

DETAILED DESCRIPTION OF THE PREFERRED EMBODIMENT

Figure 1:
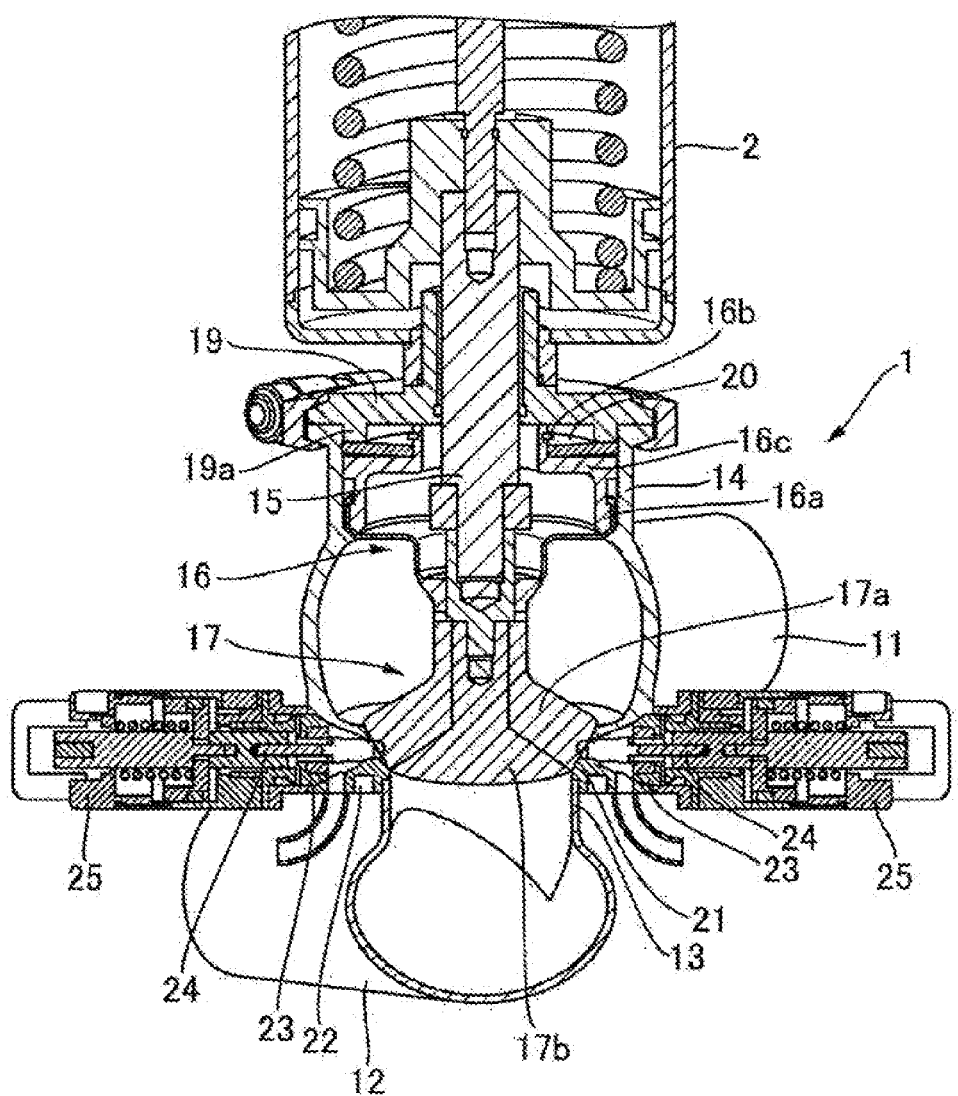
FIG. 1 is a view illustrating a structure of a mixture preventing valve according to an embodiment of the present invention.

<<Configuration Example of Mixture Preventing Valve of the Present Invention>>

Hereinafter, a configuration of a mixture preventing valve of the present invention will be described by taking specific examples. Embodiments described below are used in order to facilitate understanding of the present invention, and do not restrict the present invention. That is, it is needless to say that the present invention may be modified or improved without departing from its spirit, and the equivalents thereof are contained in the present invention. Additionally, the specific shape, dimensions, and material of the components of mixture preventing valves described below are only an illustrative example, and are freely designed as long as effects produced by the present invention are obtained.

First Embodiment

Hereinafter, a mixture preventing valve 1 according to a first embodiment of the present invention will be described with reference to FIG. 1 and FIG. 2. The mixture preventing valve 1 is provided between transport lines of two fluids different from each other, regulates inflow of a fluid flowing through one of the transport lines to the other transport line when the valve is closed, and the mixture preventing valve permits inflow of the fluid from the one transport line to the other transport line when the valve is opened.

More specifically, a first transport line is a flow passage for allowing a first fluid (for example, hot water) to flow, and a second transport line is a flow passage for allowing a second fluid (for example, a refreshing beverage or an alcoholic beverage) to flow. These transport lines each have a plurality of pipes disposed in parallel in the same plane, and the first and second transport lines are located at the different heights in the vertical direction, and are disposed in the directions substantially orthogonal to each other. The mixture preventing valve 1 is provided at intersection portion where the above two transport lines are arranged in the vertical direction, and the mixture preventing valve 1 is capable of communicating with the transport lines at the portion.

The arrangement position of the mixture preventing valve 1 is not limited to the position where the two transport lines are disposed in the directions orthogonal to each other, and the two transport lines may be disposed so as to intersect at other angles such as 30 degrees and 60 degrees. Additionally, the present invention is not limited to a configuration in which the mixture preventing valve is disposed between the two transport lines arranged in the vertical direction, and the mixture preventing valve may be disposed between the two transport lines arranged in the horizontal direction.

A structure of the mixture preventing valve 1 will be described. As illustrated in FIG. 1, the mixture preventing valve 1 is provided in an intersection part where an upper pipe part 11 and a lower pipe part 12 are orthogonal to each other, and has a communication pipe part 13, and a housing 14 integrally disposed above the communication pipe part 13. More specifically, the upper pipe part 11 is connected to the above first transport line, and the inside thereof forms a first flow passage for allowing the first fluid to flow, similarly to the first transport line. The lower pipe part 12 is connected to the above second transport line, and the inside thereof forms a second flow passage for allowing the second fluid to flow, similarly to the second transport line.

The communication pipe part 13 vertically extends between the upper pipe part 11 and the lower pipe part 12, and connects these two pipe parts 11, 12. An internal space of the communication pipe part 13 communicates with respective internal spaces of the upper pipe part 11 and the lower pipe part 12. That is, the internal space of the communication pipe part 13 forms a communication passage for allowing the first flow passage and the second flow passage to communicate with each other. The internal space of the communication pipe part 13 forms a valve body, and houses a valve body 17 at a closed position when the valve body 17 is located at the closed position (position where the valve body 17 closes the communication passage).

The housing 14 is connected to the upper pipe part 11 on a side opposite to the communication pipe part 13. An internal space of the housing 14 is located at a position beside the internal space of the communication pipe part 13 (communication passage) with the internal space of the upper pipe part 11 (first flow passage) therebetween. The internal space of the housing 14 forms a space through which a below described valve rod 15 passes when the valve rod 15 vertically advances and retreats. Additionally, a lid 19 is mounted on an upper end of the housing 14 which is an open end, and the opening is blocked by this lid 19.

Now, an internal structure of the mixture preventing valve 1 will be described. As illustrated in FIG. 1 and FIG. 2, in the valve, the valve rod 15, an annular part 16, the valve body 17, and a valve seat 18 are provided.

The valve rod 15 is a rod-like member that has an axial lower end supporting the valve body 17. Additionally, the valve rod 15 is disposed such that the axial direction thereof is along the vertical direction, penetrates the lid 19 to pass the inside of the housing 14 across the internal space of the upper pipe part 11, as illustrated in FIG. 1. A base end of the valve rod 15 that protrudes above the housing 14 is connected to an air cylinder 2 that is a drive unit fixed onto the housing 14. When the air cylinder 2 operates, the valve rod 15 advances and retreats along the axial direction.

The annular part 16 is composed of two portions having diameters different from each other. Specifically, the annular part 16 is composed of a large diameter part 16a, a small diameter part 16b which is smaller than the part 16a, and a horizontal step part 16c formed between these parts 16a, 16b (refer to FIG. 1 and FIG. 3). The large diameter part 16a is disposed concentrically with the housing 14. The small diameter part 16b is disposed concentrically with the large diameter part 16a. The valve rod 15 is disposed at such positions as to pass respective diametrical central parts of the large diameter part 16a and the small diameter part 16b.

A disc spring 20 is disposed at a position between the annular part 16 and the lid 19 in the axial direction of the valve rod 15.

The valve body 17 has a plate-like large diameter part having a lower surface forming a convex shape, as a whole, and is movable integrally with the valve rod 15. When the valve body 17 moves downward, the valve body 17 comes into contact with a concave valve seat (below described in detail) formed in a bottom inner peripheral edge of the communication pipe part 13, so that an internal space, namely, the communication passage is opened and closed. The valve body 17 according to this embodiment is a molded article of polytetrafluoroethylene (PTFE), polyether ether ketone (PEEK), or the like. Additionally, the valve body 17 according to this embodiment is divided into a plurality of parts (two in this embodiment) relatively movable in the movement direction of the valve rod 15 (in other words, the movement direction of the valve body 17).

Detailed description will be made with reference to FIG. 2. The valve body 17 is composed of a first valve body piece 17a located on the outside, and a second valve body piece 17b located on the inside of the first valve body piece. The second valve body piece 17b is axially connected to a lower end of the valve rod 15, and the lower end extends downward with respect to the first valve body piece 17a. The first valve body piece 17a forms a hollow shape fitted to an outer periphery of the second valve body piece 17b on the downward side so as to be relatively movable only in the vertical direction. The above plate-like large diameter part of the valve body 17 is formed by combination of both the first valve body piece 17a and the second valve body piece 17b.

An upper end of the first valve body piece 17a forms a thin cup shape having an open upper part as illustrated in the figures, and is supported between the housing 14 and the large diameter part 16a of the annular part 16. Specifically, a hook part integrally formed from the upper end of the first valve body piece 17a toward the inside is engaged with a shoulder part integrally formed from an intermediate part of the large diameter part 16a of the annular part 16 toward the outside.

The first valve body piece 17a and the second valve body piece 17b move integrally with the valve rod 15. Specifically, the second valve body piece 17b connected to a leading end of the valve rod 15 is connected to the first valve body piece 17a. Therefore, when the valve rod 15 vertically moves, both the first valve body piece 17a and the second valve body piece 17b vertically move integrally with the valve rod 15. When the valve rod 15 moves upward, the cup-shaped part forming the upper end of the first valve body piece 17a is thin, and therefore the cup-shaped part warps so as to enter the large diameter part 16a.

The valve seat 18 is formed in a concave shape on the bottom inner peripheral edge of the communication pipe part 13, has a diameter gradually reducing downward, and vertically has an upper valve seat 18a and a lower valve seat 18b interposed with an internal space of a below described hollow block part 23 therebetween. These upper valve seat 18a and lower valve seat 18b have convex lower surfaces that are continued, as illustrated in FIG. 2.

When the valve body 17 lowers to come into contact with the valve seat 18, the communication pipe part 13 is blocked. However, in this embodiment, as described above, the valve body 17 is composed of the two valve body pieces 17a, 17b disposed in the vertical direction, and the respective bottom surfaces (also outer peripheral surfaces) of the valve body pieces 17a, 17b come into contact with different positions of the valve seat 18, namely, the upper valve seat 18a and the lower valve seat 18b.

Figure 2:
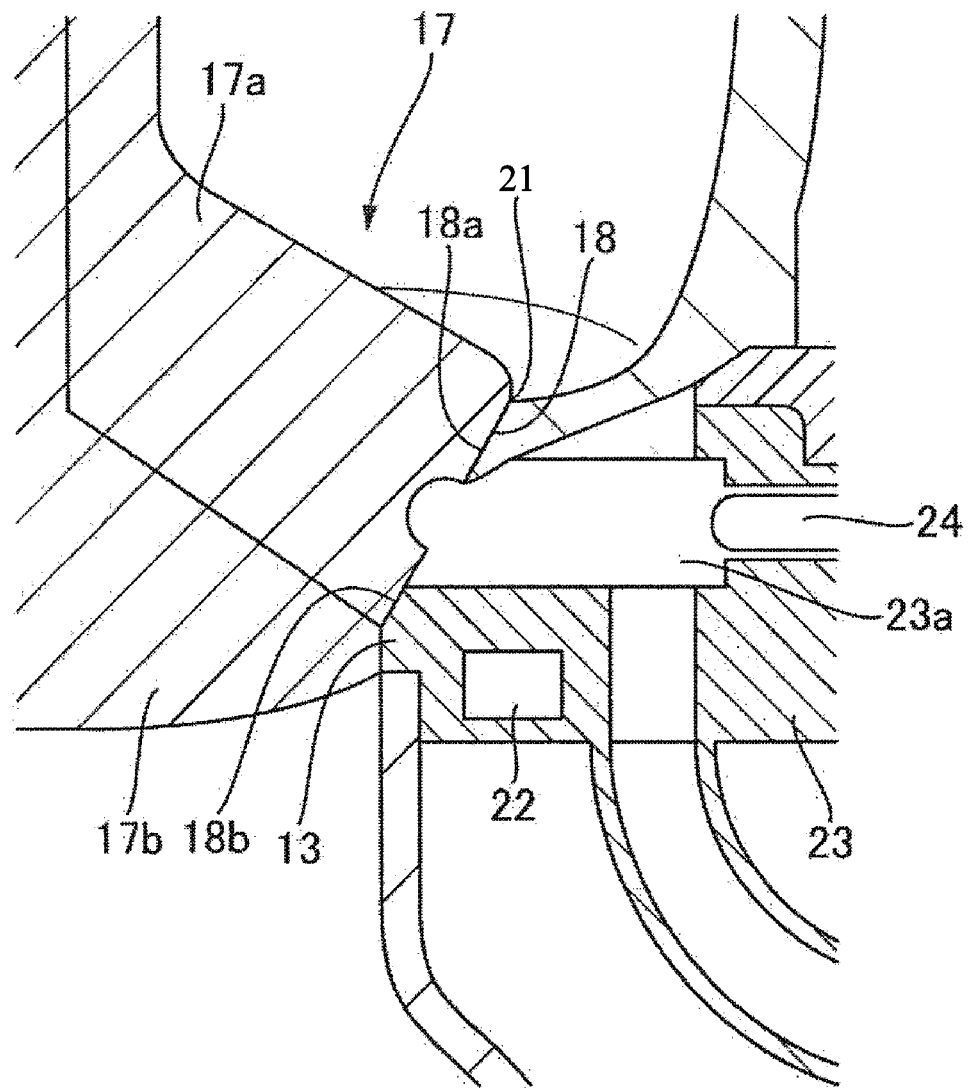
FIG. 2 is an enlarged view illustrating a structure of a periphery of a valve seat in FIG. 1.

When the valve body 17 is located at a closed position, the outer peripheral surfaces of the first valve body piece 17a and the second valve body piece 17b come into contact with the above tapered surface 21, as illustrated in FIG. 2. That is, both a portion where the valve seat 18 comes into contact with the outer peripheral surface of the first valve body piece 17a, and a portion where the valve seat 18 comes into contact with the outer peripheral surface of the second valve body piece 17b are on the same plane of the inner wall surface of the communication pipe part 13, strictly speaking, exist on the above tapered surface 21.

A position where the valve seat 18 comes into contact with the outer peripheral surface of the first valve body piece 17a is located above a position where the valve seat 18 comes into contact with the outer peripheral surface of the second valve body piece 17b. The minimum diameter of the outer peripheral surface of the first valve body piece 17a is slightly larger than the maximum diameter of the outer peripheral surface of the second valve body piece 17b.

In addition to the configuration described above, a characteristic configuration in the first embodiment will be described. As illustrated in FIG. 1, a water jacket 22 is provided at a position surrounding the communication pipe part 13. Cooling water flows into this jacket 22, so that heat is transferred from the fluid (first fluid) flowing in the upper pipe part 11 to the fluid (second fluid) flowing in the lower pipe part 12 through the valve rod 15 and the valve body 17, so that heating the second fluid is suppressed.

The hollow block part 23 is disposed around the communication pipe part 13 in addition to the above water jacket 22. An inner space 23a of this hollow block part 23 is adjacent to the communication passage being the internal space of the communication pipe part 13 in the direction orthogonal to the axial direction of the valve rod 15 (that is, the movement direction of the valve body 17), and communicates with the communication passage.

The inner space 23a of the hollow block part 23 is opened to the atmosphere through an intermediate pipe 23b connected to a lower part of the hollow block part 23.

The inner space 23a of the hollow block part 23 can be opened and closed by a pair of left and right on-off valves 24 illustrated in FIG. 1. The opening and closing of the on-off valve 24 is switched by an actuator 25 controlled by a controller (not illustrated).

Now, effectiveness of the mixture preventing valve according to the first embodiment will be described. As described in the section "Description of the Related Art", in the mixture preventing valve in which the valve body comes into contact with the valve seat at a plurality of portions, when a formation surface of the valve seat has a complicated shape, a flow of fluid stagnates in the periphery of the valve seat, and the flow velocity lowers. Therefore, when washing liquid flows in the flow passage (that is, the communication passage) formed with the valve seat to wash the flow passage, a long time is required in order to suitably wash the periphery of the valve seat.

On the other hand, in the mixture preventing valve 1 according to the first embodiment of the present invention, in the inner wall surface of the communication pipe part 13 forming the valve seat 18, a portion that comes into contact with the outer peripheral surface of the first valve body piece 17a, and a portion that comes into contact with the outer peripheral surface of the second valve body piece 17b exist on the same plane (on the tapered surface 21 in this embodiment). The above tapered surface may be a spherical surface. In the tapered surface 21, a longitudinal section in the figure, namely, a section including a shaft of the valve body 17, is a straight line. However, in a case of the spherical surface, the section is a curved line. In a case where the valve seat 18 is configured by the spherical surface, the shape of the bottom surface of the valve body 17 has such a shape as to match the shape of the valve seat.

With the above configuration, the shape of the formation surface of the valve seat 18 is simplified, and therefore when the valve body 17 (17a, 17b) rises to open the vale at the time of washing or the like, and washing liquid or the like flows from the upper pipe part 11 to the lower pipe part 12, the washing liquid or the like passing the inside of the communication pipe part 13 smoothly flows without generating a vortex in the periphery of the valve seat 18. As a result, the periphery of the valve seat 18 is suitably washed.

In the first embodiment, the valve rod 15 supporting the valve body 17 is only one, and the valve rod 15 penetrates only the internal space of the upper pipe part 11 among the upper pipe part 11 and the lower pipe part 12 to protrude outside the pipe. Consequently, as illustrated in FIG. 1, the drain pipe that penetrates the lower pipe part 12 is provided, so that it is possible to stabilize the quality of products such as beer flowing in the second flow passage formed in the lower pipe part 12.

However, the present invention is not limited to such a configuration. A valve rod 15 may be provided each valve body (every valve body piece). In such a configuration, a valve rod supporting a valve body piece located on an upper side may extend upward, penetrate an internal space of an upper pipe part 11 to protrude outside the pipe, and a valve rod supporting a valve body piece located on a lower side may extend downward to protrude outside the pipe across an internal space of a lower pipe part 12.

Second Embodiment

Hereinafter, a mixture preventing valve (mixture preventing valve 1X) according to a second embodiment of the present invention will be described with reference to FIG. 3. The mixture preventing valve 1X according to the second embodiment follows the basic configuration of the mixture preventing valve 1 according to the first embodiment, and produces effects similar to the effects in the first embodiment, and a mix proof function is further added. Therefore, in the following description, only portions of the second embodiment different from the portion of the first embodiment will be described. Note that, in FIG. 3, components identical with the components provided in the mixture preventing valve 1 according to the first embodiment are denoted by the same reference numerals.

In the second embodiment, similarly to the first embodiment, a valve body 30 has a plate-like large diameter part having a lower surface forming a convex shape, as a whole, and is divided into two pieces, namely a first valve body piece 31 and a second valve body piece 32 on the inside and the outside. The respective valve body pieces have substantially similar shapes to the first embodiment. The first valve body piece 31 can come into contact with a upper valve seat 18a, and the second valve body piece 32 can come into contact with an lower valve seat 18b, which is similar to the first embodiment.

Figure 3:
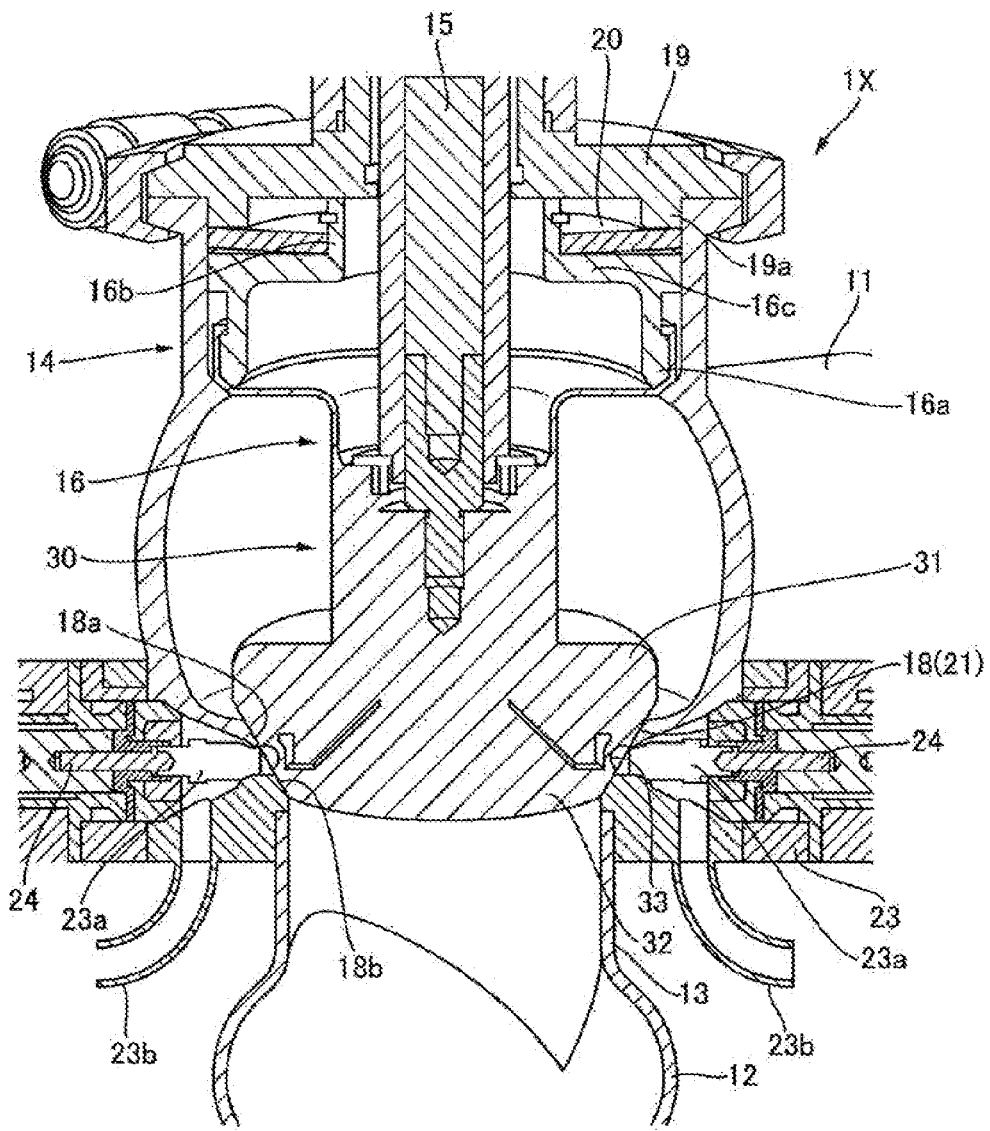
FIG. 3 is a view illustrating a structure of a mixture preventing valve according to a modification.

As illustrated in FIG. 3, the first valve body piece 31 and the second valve body piece 32 are connected by a connecting part 33 provided between respective facing surfaces. As illustrated in this figure, a clearance is formed between the facing surface of the first valve body piece 31 and the facing surface of the second valve body piece 32. The second valve body piece 32 is movable slightly upward by the amount of the above clearance so as to approach the first valve body piece 31. That is, in the second embodiment, the second valve body piece 32 is movable relatively to the first valve body piece 31 in the axial direction of the valve rod 15 (that is, the movement direction of the valve body 30).

When the second valve body piece 32 moves relatively to the first valve body piece 31 so as to approach the first valve body piece 31, an internal space of a communication pipe part 13 communicates with an internal space of a lower pipe part 12. At this time, the internal space of the communication pipe part 13 communicates with an inner space 23a of a hollow block part 23. Furthermore, the inner space 23a of the hollow block part 23 is opened to the atmosphere as described above.

With the above configuration, in the second embodiment, in a case where the pressure of fluid flowing in the lower pipe part 12 changes, or a water hammering phenomenon by the fluid occurs, the second valve body piece 32 moves relatively to the first valve body piece 31 so as to approach the first valve body piece 31. Consequently, the internal space of the lower pipe part 12 communicates with the inner space 23a of the hollow block part 23 through the internal space of the communication pipe part 13. As a result, the fluid flowing in the lower pipe part 12 (that is, liquid which causes the pressure change or the water hammering phenomenon) is guided to the inner space 23a of the hollow block part 23 through the communication pipe part 13, and further discharged from the inner space 23a to the outside.

When the second valve body piece 32 moves upward so as to approach the first valve body piece 31, an outer peripheral surface of the first valve body piece 31 is kept in a contact state with the valve seat 18. Therefore, when the fluid is discharged from the inner space 23a of the hollow block part 23 to the outside through the communication pipe part 13 due to the pressure change of the fluid flowing in the lower pipe part 12 or occurrence of the water hammering phenomenon, the first valve body piece 31 can prevent the fluid from entering the upper pipe part 11.

Third Embodiment

Hereinafter, a mixture preventing valve (mixture preventing valve 1Y) according to a third embodiment of the present invention will be briefly described with reference to FIGS. 4a and 4b. The mixture preventing valve 1Y according to the third embodiment is disposed in a communication pipe part 13 provided in an intersection part where an upper pipe part 11 forming a first flow passage and a lower pipe part 12 forming a second flow passage are orthogonal to each other, similarly to the first embodiment and the second embodiment, and includes a valve body 17 having a first valve body piece 17a and a second valve body piece 17b enabling upper and lower pipe parts 11, 12 to communicate with each other. The mixture preventing valve 1Y includes a valve rod 15 and a drain pipe 106A that penetrate the upper and lower pipe parts 11, 12, the first valve body piece 17a is formed in a lower part of an outer housing 15A of the valve rod 15, and the second valve body piece 17b is formed in an upper part of the drain pipe 106A. The valve rod 15 (outer housing 15A) and the drain pipe 106A are vertically driven, so that the first and second valve body pieces 17a, 17b move between a position where both the first and second valve body pieces come into contact with a valve seat 18 formed on an inner wall surface of a communication pipe part 13 (state of FIGS. 4a and 4b), and a position where both the first and second valve body pieces are separated from the valve seat.

Similarly to the first embodiment and the second embodiment, in the valve seat 18, in an inner wall surface of the communication pipe part 13 configuring the valve seat 18, a first valve seat 18a that comes into contact with an outer peripheral surface of the first valve body piece 17a, and a second valve seat 18b that comes into contact with an outer peripheral surface of the second valve body piece 17b exist on the same plane (on a tapered surface in this embodiment). Consequently, the shape of a formation surface of the valve seat 18 is simplified, and therefore it is possible to obtain working effects similar to the first and second embodiments, for example, when the valve body 17 (17a, 17b) rises to open the valve at the time of washing or the like, and washing liquid or the like flows from the upper pipe part 11 to the lower pipe part 12, the washing liquid or the like passing the inside of the communication pipe part 13 smoothly flows without generating a vortex in the periphery of the valve seat 18, and the periphery of the valve seat 18 is suitably washed.

Figure 4A:
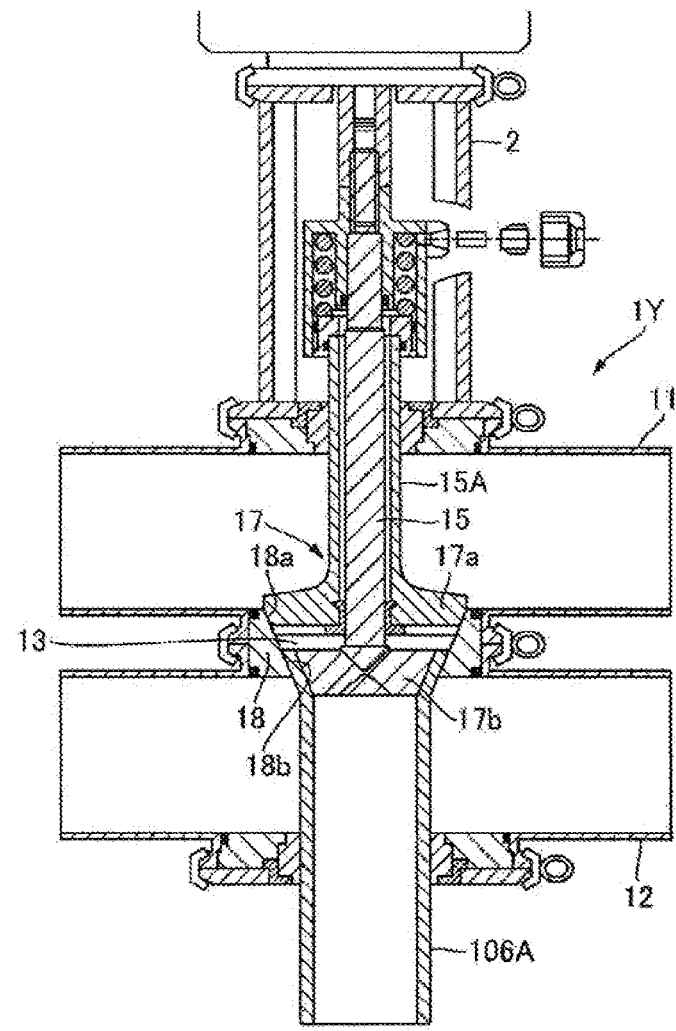
FIGS. 4a and 4b is a view illustrating a structure of a mixture preventing valve according to another modification.
Figure 4B:
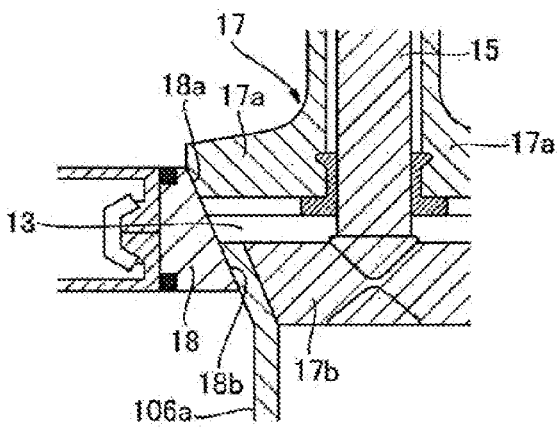
Figure 5A:
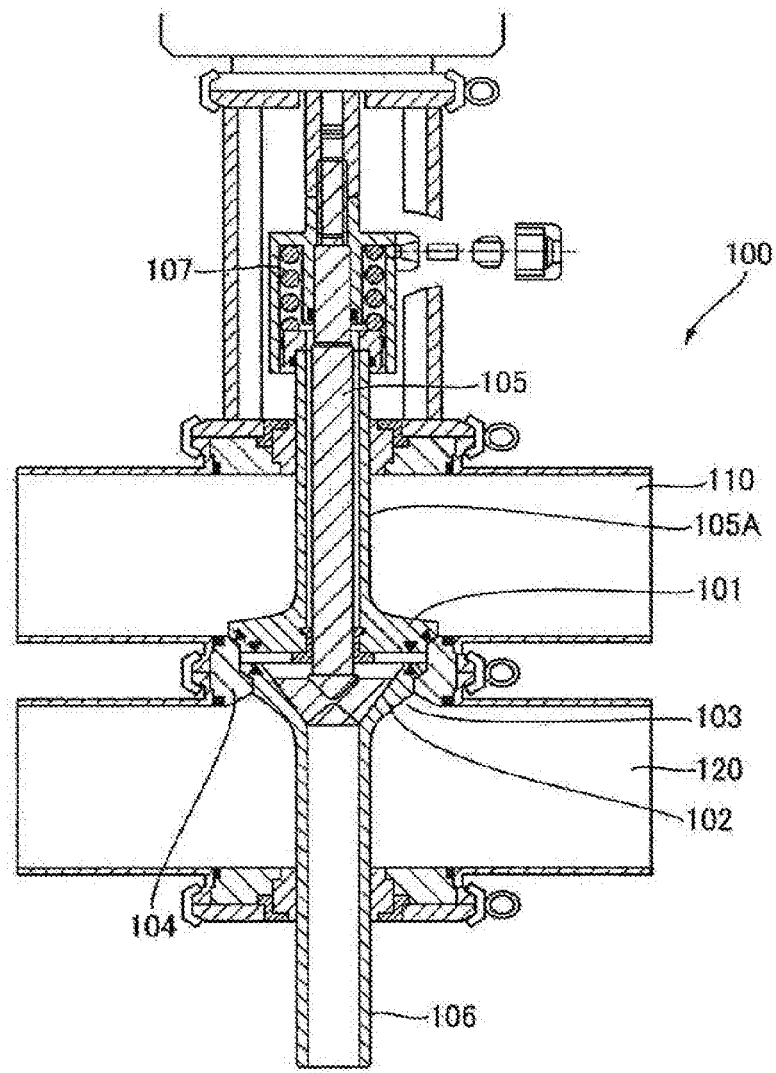
FIGS. 5a and 5b is a view illustrating a structure of a conventional mixture preventing valve.
Figure 5B:
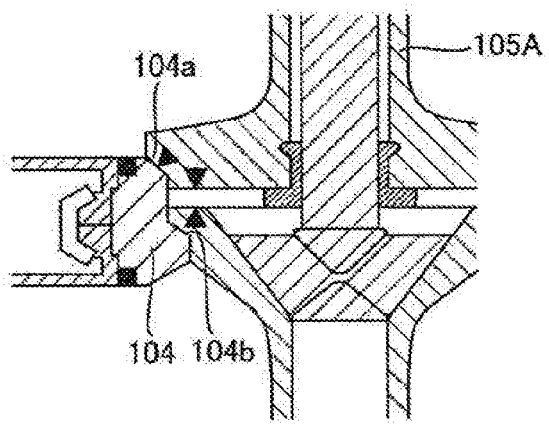

In the mixture preventing valve 1Y of the third embodiment, the communication pipe part 13 is blocked in the state of FIGS. 4a and 4b, and, for example, washing water and a product independently flow through the upper pipe part and the lower pipe part, respectively, while the communication pipe part 13 is opened by raising the valve body 17 (both 17a and 17b), and the upper and lower pipe parts communicate with each other, so that the lower pipe part 120 can be washed by washing water flowing through the upper pipe part 110. In addition to the above, the mix proof function is provided.

DESCRIPTION OF SYMBOLS

1: mixture preventing valve
2: air cylinder
11: upper pipe part
12: lower pipe part
13: communication pipe part
14: housing
15: valve rod
16: annular part
16a: large diameter part
16b: small diameter part 16c: step part
17: valve body
17a: first valve body piece
17b: second valve body piece
18: valve seat
19: lid
19a: convex part
20: disc spring
21: tapered surface
22: water jacket
23: hollow block part
23a: inner space (space)
24: on-off valve
25: actuator
30: valve body
31: first valve body piece
32: second valve body piece
33: connecting part
100: mixture preventing valve
101: first valve body
102: second valve body
103: communication passage
104: valve seat
105: upper valve rod
106: lower valve rod
110, 120: pipe part

What is claimed is:

1. A mixture preventing valve comprising:
a first flow passage for allowing a first fluid to flow;
a second flow passage for allowing a second fluid to flow;
a communication passage for allowing the first flow passage and the second flow passage to communicate with each other;
a valve body that moves to open and close the communication passage; and
a valve seat that is provided on an inner wall surface of the communication passage, and comes into contact with the valve body, wherein
the valve body includes a first valve body piece and a second valve body piece that are arranged side by side in a state of being separated from each other in a movement direction of the valve body, wherein
the valve seat comes into contact with respective outer peripheral surfaces of the first valve body piece and the second valve body piece, and
in the inner wall surface, a portion where the valve seat comes into contact with the outer peripheral surface of the first valve body piece, and a portion where the valve seat comes into contact with the outer peripheral surface of the second valve body piece exist on (i) a tapered surface whose section is a straight line or (ii) a spherical surface whose section is a curved line, and wherein
the second valve body piece is disposed at a position closer to the second flow passage than the first valve body piece in the movement direction, and is movable relatively to the first valve body piece in the movement direction,
a hollow block part is disposed around the communication passage,
an inner space of the hollow block part adjacent to the communication passage in a direction intersecting with the movement direction is provided, and
the inner space is opened to atmosphere, and when the second valve body piece relatively moves in such a direction as to approach the first valve body piece in the movement direction, the inner space communicates with the communication passage and the second flow passage, while the outer peripheral surface of the first valve piece is kept in contact state with the valve seat.

2. The mixture preventing valve according to claim 1, wherein
the spherical surface has a diameter which reduces from one end side to the other end side in the movement direction,
the respective outer peripheral surfaces of the first valve body piece and the second valve body piece each have a diameter which reduces from one end side to the other end side in the movement direction, and
the portion where the valve seat comes into contact with the outer peripheral surface of the first valve body piece, and the portion where the valve seat comes into contact with the outer peripheral surface of the second valve body piece exist on the spherical surface.

3. The mixture preventing valve according to claim 1, further comprising
a valve rod that supports the valve body, and moves integrally with the valve body in the movement direction, wherein
the valve rod extends in the movement direction and penetrates only the first flow passage among the first flow passage and the second flow passage to protrude outside the first flow passage.

4. The mixture preventing valve according to claim 1, further comprising a water jacket provided at a position surrounding the communication passage, wherein the water jacket is configured to allow a water to flow into the water jacket.

5. The mixture preventing valve according to claim 2, further comprising a water jacket provided at a position surrounding the communication passage, wherein the water jacket is configured to allow a water to flow into the water jacket.

6. The mixture preventing valve according to claim 3, further comprising a water jacket provided at a position surrounding the communication passage, wherein the water jacket is configured to allow a water to flow into the water jacket.

* * * * *